(12) United States Patent
Nagase et al.

(10) Patent No.: US 11,945,584 B2
(45) Date of Patent: Apr. 2, 2024

(54) POWER SUPPLY SYSTEM FOR MOVING OBJECT, AND AERIAL VEHICLE

(71) Applicant: Panasonic Intellectual Property Management Co., Ltd., Osaka (JP)

(72) Inventors: Ryosuke Nagase, Osaka (JP); Mutsuhiko Takeda, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 169 days.

(21) Appl. No.: 17/755,324

(22) PCT Filed: Oct. 20, 2020

(86) PCT No.: PCT/JP2020/039436
§ 371 (c)(1),
(2) Date: Apr. 27, 2022

(87) PCT Pub. No.: WO2021/100391
PCT Pub. Date: May 27, 2021

(65) Prior Publication Data
US 2022/0363384 A1 Nov. 17, 2022

(30) Foreign Application Priority Data
Nov. 21, 2019 (JP) ................. 2019-210530

(51) Int. Cl.
*B64C 39/02* (2023.01)
*B64D 27/24* (2006.01)
(Continued)

(52) U.S. Cl.
CPC ............ *B64C 39/024* (2013.01); *B64D 27/24* (2013.01); *B64D 35/04* (2013.01); *B64D 35/08* (2013.01);
(Continued)

(58) Field of Classification Search
CPC ....... B64C 39/024; B64C 27/08; B64C 39/02; B64D 27/24; B64D 35/04; B64D 35/08;
(Continued)

(56) References Cited

U.S. PATENT DOCUMENTS

| 10,723,235 | B1 * | 7/2020 | Orender | ................. B60L 58/19 |
| 2018/0281947 | A1 * | 10/2018 | Sakai | ................... B64C 39/024 |
| 2020/0290742 | A1 * | 9/2020 | Kumar | ................... B64D 27/24 |

FOREIGN PATENT DOCUMENTS

| JP | 2016-024162 | | 2/2016 |
| JP | 2016024162 A | * | 2/2016 |

(Continued)

OTHER PUBLICATIONS

International Search Report of PCT application No. PCT/JP2020/039436 dated Dec. 28, 2020.

*Primary Examiner* — Valentina Xavier
(74) *Attorney, Agent, or Firm* — Rimon P.C.

(57) ABSTRACT

A plurality of energy storage packs supply a current to a plurality of motor driver that drive a plurality of motors mounted on moving object, respectively. Sub energy storage pack supplies a current to at least one of a plurality of first current paths connecting the plurality of motor driver and the plurality of energy storage packs, or pulls a current from at least one of the plurality of first current paths. Controller controls the plurality of first switches and the plurality of second switches to adjust capacities between the plurality of energy storage packs.

7 Claims, 8 Drawing Sheets

(51) Int. Cl.
  *B64D 35/04* (2006.01)
  *B64D 35/08* (2006.01)
  *H01M 10/42* (2006.01)
  *H01M 10/44* (2006.01)
  *H01M 50/204* (2021.01)
  *H01M 50/249* (2021.01)
  *H02J 7/00* (2006.01)
  *B64U 30/20* (2023.01)
  *B64U 50/19* (2023.01)

(52) U.S. Cl.
  CPC ....... *H01M 10/425* (2013.01); *H01M 10/441* (2013.01); *H01M 50/204* (2021.01); *H01M 50/249* (2021.01); *H02J 7/0019* (2013.01); *H02J 7/0063* (2013.01); *B64U 30/20* (2023.01); *B64U 50/19* (2023.01); *H01M 2010/4271* (2013.01); *H01M 2220/20* (2013.01); *H02J 2207/20* (2020.01)

(58) Field of Classification Search
  CPC ............ B64D 2221/00; H01M 10/425; H01M 10/441; H01M 50/204; H01M 50/249; H01M 2010/4271; H01M 2220/20; H01M 10/44; H01M 10/48; H02J 7/0019; H02J 7/0063; H02J 2207/20; H02J 2310/44; B64U 30/20; B64U 50/19; B64U 10/13; Y02E 60/10
  See application file for complete search history.

(56) References Cited

FOREIGN PATENT DOCUMENTS

| | | |
|---|---|---|
| JP | 2016-222031 | 12/2016 |
| WO | 2016/189797 | 12/2016 |

* cited by examiner

POWER SUPPLY SYSTEM FOR MOVING OBJECT, AND AERIAL VEHICLE

CROSS-REFERENCE TO RELATED APPLICATIONS

This application is a U.S. national stage application of the PCT International Application No. PCT/JP2020/039436 filed on Oct. 20, 2020, which claims the benefit of foreign priority of Japanese patent application No. 2019-210530 filed on Nov. 21, 2019, the contents all of which are incorporated herein by reference.

TECHNICAL FIELD

The present invention relates to a power supply system for a moving object mounted on a moving object that includes a plurality of motors, and an aerial vehicle.

BACKGROUND ART

There may be a case where the following system is adopted. A plurality of battery packs are mounted on an aerial vehicle having a plurality of motors represented by a drone or the like (see PTL 1, for example), and the plurality of motors and the plurality of battery packs are connected to each other on a one-to-one basis. In such a case, irregularities occur in remaining capacity (state of charge (SOC)) among the plurality of battery packs due to irregularities in load among the plurality of motors. In this case, even when the SOCs of other battery packs are not 0% at a point of time that the SOC of one battery pack is 0%, the aerial vehicle cannot continue flying. That is, the energies of other battery packs cannot be effectively used. This means that an actual flight distance becomes shorter than a flyable distance that the aerial vehicle can originally fly with the whole energy of the plurality of battery packs.

Further, due to the irregularities in load among the plurality of motors, the irregularities also occur in charge/discharge rate and in depth of discharge among the plurality of battery packs. Accordingly, irregularities occur also in the degree progress of a deterioration state (state of health: SOH). The full charge capacity (FCC) of the battery pack where the SOH is lowered becomes smaller than the FCCs of other battery packs.

Accordingly, the decrease of the flyable distance is further accelerated.

CITATION LIST

Patent Literature

PTL 1: Unexamined Japanese Patent Publication No. 2016-222031

SUMMARY OF THE INVENTION

The present disclosure has been made in view of such circumstances, and it is an object of the present disclosure to provide a technique for effectively utilizing capacities of a plurality of energy storage packs mounted on a moving object that includes a plurality of motors.

To overcome the above-mentioned drawbacks, according to the present disclosure, there is provided a power supply system for a moving object, the power supply system including: a plurality of energy storage packs configured to respectively supply a current to a plurality of motor driver for driving a plurality of motors mounted on the moving object; a sub energy storage pack configured to supply a current to at least one of a plurality of first current paths that are connected between the plurality of motor driver and the plurality of energy storage packs or to pull the current from at least one of the plurality of first current paths; a plurality of first switches respectively inserted in a plurality of second current paths that are connected between the plurality of first current paths and the sub energy storage pack; a plurality of second switches respectively inserted between a plurality of connecting points on the plurality of the first current path to which the plurality of second current paths are connected and the plurality of energy storage packs; and a controller configured to adjust a balance in capacity among the plurality of energy storage packs by controlling the plurality of first switches and the plurality of second switches.

According to the present disclosure, it is possible to effectively utilize capacities of a plurality of energy storage packs mounted on a moving object that includes a plurality of motors.

BRIEF DESCRIPTION OF THE DRAWINGS

FIGS. 1(a) and (b) are schematic views schematically illustrating an aerial vehicle on which a power supply system according to an exemplary embodiment is mounted.

DESCRIPTION OF EMBODIMENT

Figure 1:
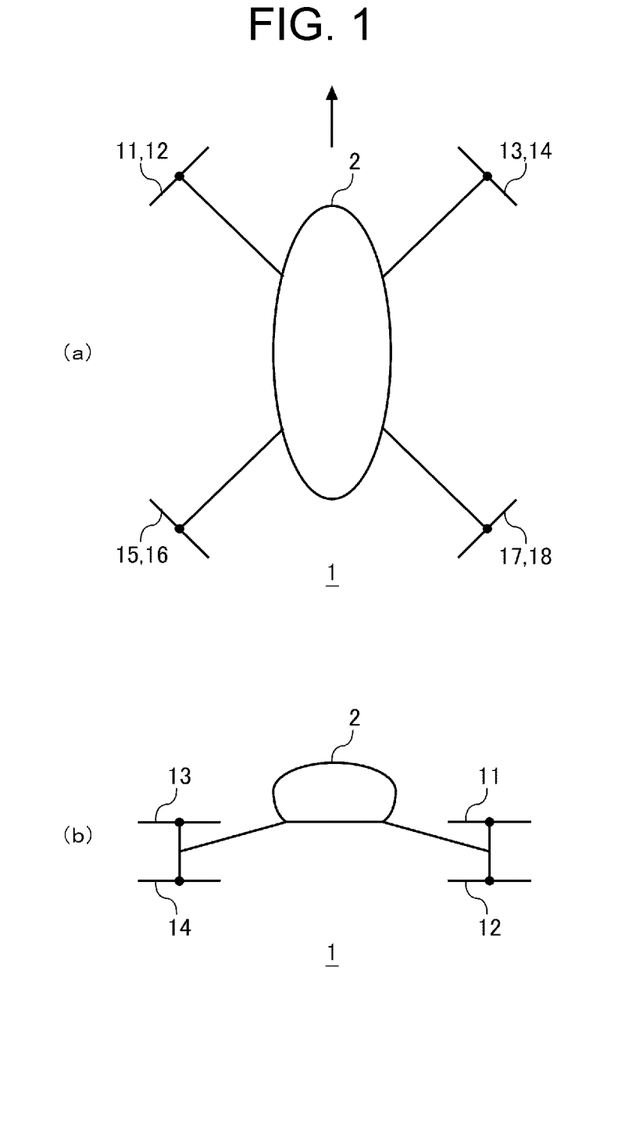

FIGS. 1(a) and (b) are schematic views schematically illustrating aerial vehicle 1 on which a power supply system according to an exemplary embodiment is mounted. FIG. 1 (a) is a top plan view of aerial vehicle 1 as viewed from above, and FIG. 1 (b) is a front view of aerial vehicle 1 as viewed from a front side. Aerial vehicle 1 according to the exemplary embodiment may be an unmanned drone used for aerial photographing, agrochemical spraying, or the like, or may be a manned drone that allows a human to ride on body portion 2.

Aerial vehicle 1 illustrated in FIGS. 1(*a*) and (*b*) include eight propellers 11 to 18. Four arms are diagonally attached to body portion 2, and two propellers are mounted on upper and lower sides of a distal end of each arm in a vertical direction.

Figure 2:
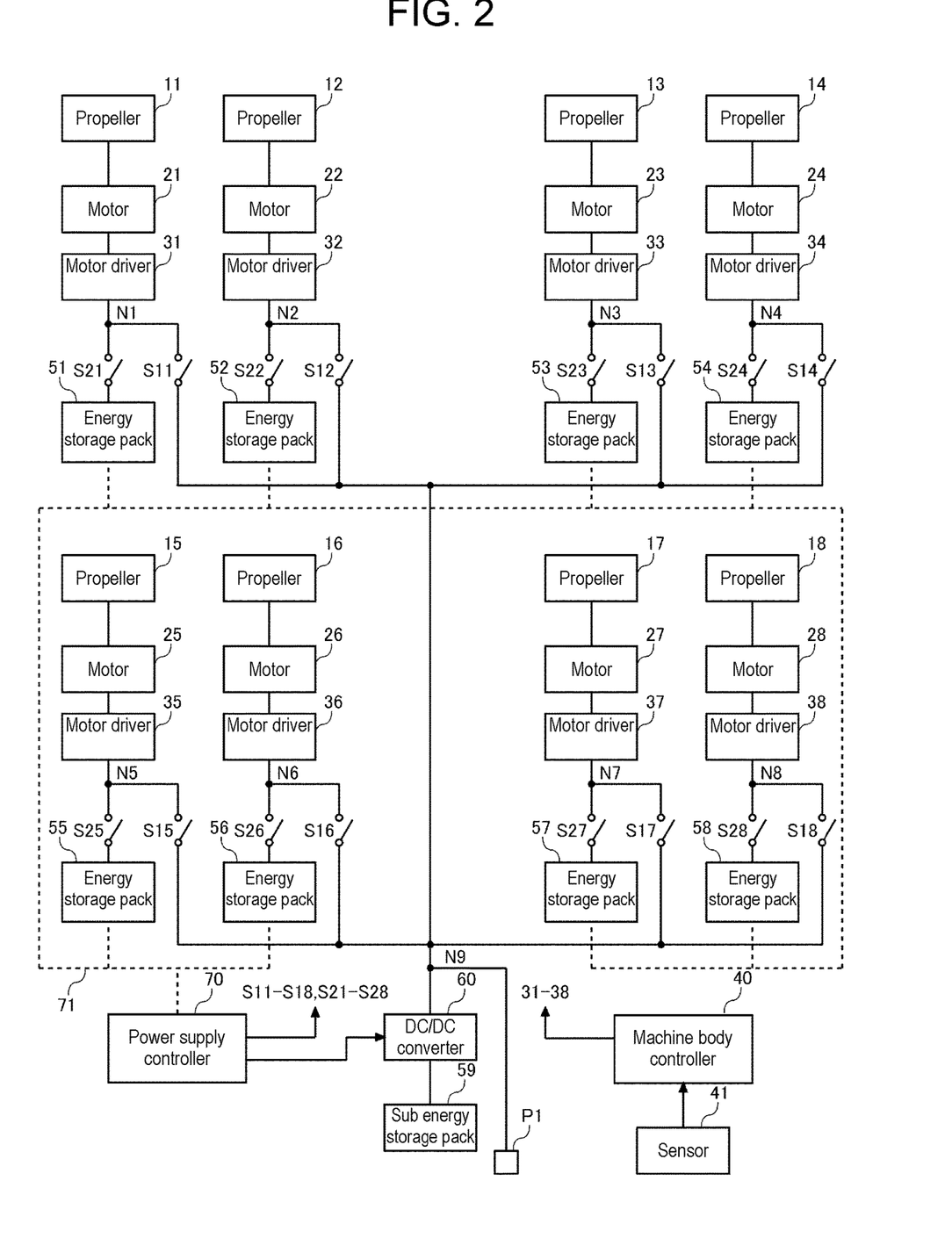
FIG. 2 is a functional block diagram of the aerial vehicle on which the power supply system according to the exemplary embodiment is mounted.

FIG. 2 is a functional block diagram of aerial vehicle 1 on which the power supply system according to the exemplary embodiment is mounted. Aerial vehicle 1 includes: eight propellers 11 to 18; eight motors 21 to 28; eight motor driver 31 to 38; machine body controller 40, sensor 41, and the power supply system.

Eight motors 21 to 28 are connected to rotary shafts of eight propellers 11 to 18, respectively. Eight motor driver 31 to 38 drive eight motors 21 to 28, respectively. Each of eight motor driver 31 to 38 includes an inverter. Each inverter converts a direct current supplied from each energy storage pack into an alternating current corresponding to a command value designated by machine body controller 40, and supplies the alternating current to each motor. Eight motors 21 to 28 respectively rotate eight propellers 11 to 18 at rotational speeds corresponding to alternating currents supplied from eight motor driver 31 to 38, respectively.

Machine body controller 40 may be formed of a microcomputer, and a nonvolatile memory (for example, electrically erasable programmable read-only memory (EEPROM) or a flash memory). Sensor 41 is a generic term for various sensors mounted on aerial vehicle 1. For example, as sensor 41, a gyro sensor, an acceleration sensor, an atmospheric pressure sensor, an ultrasonic wave sensor, a magnetic azimuth sensor, a global positioning system (GPS) sensor are mounted.

The gyro sensor detects an angular velocity of aerial vehicle 1, and outputs the angular velocity to machine body controller 40. The acceleration sensor detects an acceleration of aerial vehicle 1, and outputs the acceleration to machine body controller 40. Machine body controller 40 estimates a posture and a speed of aerial vehicle 1 based on the inputted angular velocity and acceleration. The atmospheric pressure sensor detects an atmospheric pressure at a point at which aerial vehicle 1 is located, and outputs the atmospheric pressure to machine body controller 40. The ultrasonic wave sensor receives a reflected wave of the emitted ultrasonic wave, and outputs the reflected wave to machine body controller 40. Machine body controller 40 estimates an altitude of aerial vehicle 1 based on the inputted atmospheric pressure and an ultrasonic reflection wave.

The magnetic azimuth sensor detects an azimuth based on geomagnetism, and outputs the detected azimuth to machine body controller 40. Machine body controller 40 estimates an advancing direction of aerial vehicle 1 based on the inputted azimuth. The GPS sensor receives, from a plurality of GPS satellites, radio waves that include their respective transmission times, detects the latitude and the longitude of a radio wave reception point based on the plurality of transmission times included in the plurality of received radio waves, and outputs the latitude and the longitude of the radio wave reception point to machine body controller 40. Machine body controller 40 estimates the present position of aerial vehicle 1 based on the inputted latitude and longitude.

The machine body controller 40 determines rotational speeds of eight respective motors 21 to 28 based on a predetermined machine body control program, the detection information inputted from sensor 41, and the operation information from a driver riding on body portion 2. In the embodiment, in a case where the aerial vehicle 1 is an unmanned drone, in place of the operation information from the driver riding on body portion 2, at least one of operation information transmitted by a remote control and a predetermined automatic flight program is used.

Machine body controller 40 generates command values to be set for eight respective motor driver 31 to 38 based on the determined respective rotational speeds of eight motors 21 to 28. Machine body controller 40 and eight respective motor driver 31 to 38 are connected to each other by signal lines (not illustrated in the drawing). Machine body controller 40 supplies the generated command values to eight respective motor driver 31 to 38 via the respective signal lines. The command values may be wirelessly transmitted to eight respective motor driver 31 to 38 from the machine body controller 40 without using signal lines.

When machine body controller 40 intends to move aerial vehicle 1 in any direction, machine body controller 40 decreases a rotational speed of the motor disposed in an advancing direction, and increases a rotational speed of the motor disposed in a direction opposite to the advancing direction. With such a control, aerial vehicle 1 tilts frontwardly and hence, aerial vehicle 1 can move in the advancing direction.

Further, in aerial vehicle 1, the rotation directions of the motors disposed adjacently to each other are set opposite to each other. When machine body controller 40 intends to rotate aerial vehicle 1 in any direction, machine body controller 40 increases a rotational speed of the motor rotating in the direction opposite to the direction that aerial vehicle 1 is intended to rotate with respect to a rotational speed of the motor rotating in the same direction as the direction that aerial vehicle 1 is intended to be rotated. With such a control, a rotational force in the direction that aerial vehicle 1 is intended to be rotated is generated, and aerial vehicle 1 is rotated in the rotational direction.

The power supply system that is mounted on aerial vehicle 1 includes: eight energy storage packs 51 to 58; sub energy storage pack 59; eight first switches S11 to S18; eight second switches S21 to S28; DC/DC converter 60; and power supply controller 70.

Eight energy storage packs 51 to 58 are power supply devices for supplying a current to eight motor driver 31 to 38 respectively. Sub energy storage pack 59 is an auxiliary power supply device that can supply a current to the eight first current paths that are connected between eight motor driver 31 to 38 and eight energy storage packs 51 to 58, or can pull a current from the eight first current paths.

Eight first switches S11 to S18 are respectively inserted into the eight second current paths that are connected between the eight first current paths and sub energy storage pack 59. Sub energy storage pack 59 can be electrically conductive with any current path out of the eight first current paths via eight first switches S11 to S18. Eight second switches S21 to S28 are respectively inserted between eight connecting points N1 to N8 on the eight first current paths to which the eight second current paths are connected, and eight energy storage packs 51 to 58. First switches S11 to S18 and second switches S21 to S28 may be respectively formed of a relay or a semiconductor switch.

Distal ends of the eight second current paths near a sub energy storage pack 59 are coupled into one line. DC/DC converter 60 is connected between node N9 and sub energy storage pack 59. DC/DC converter 60 is a bidirectional DC/DC converter, and can control a charge voltage or a charge current when sub energy storage pack 59 is charged and a discharge voltage or a discharge current when sub energy storage pack 59 is discharged. A charging path that is connected to charge port P1 is also connected to node N9.

Power supply controller 70 can be formed of a microcomputer and a nonvolatile memory. Power supply controller 70 and eight energy storage packs 51 to 58 are connected to each other by communication line 71. Power supply controller 70 can adjust a balance of capacities among eight energy storage packs 51 to 58 by controlling eight first switches S11 to S18 and eight second switches S21 to S28.

Figure 3:
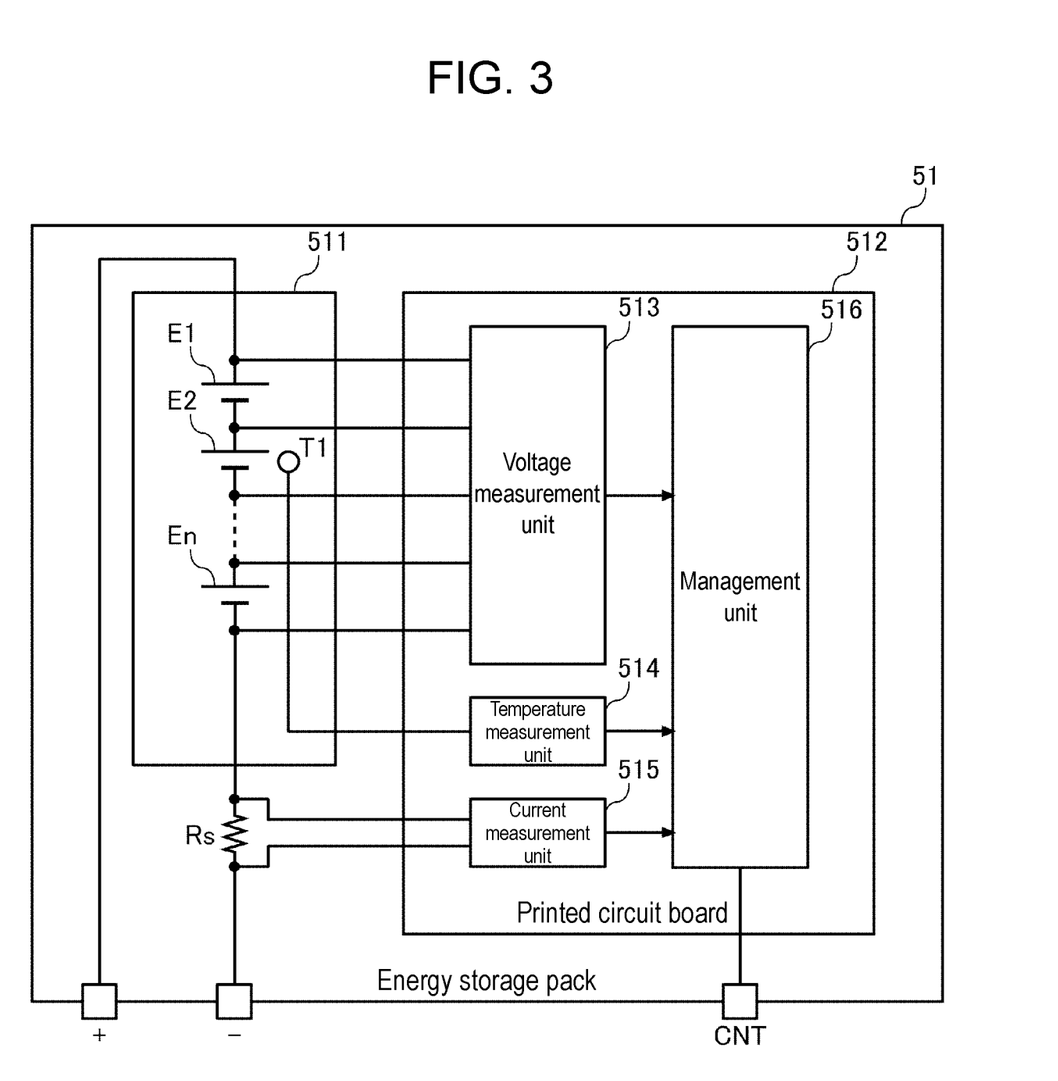
FIG. 3 is a diagram illustrating an example of an internal configuration of respective energy storage packs mounted on the aerial vehicle.

FIG. 3 is a diagram illustrating an example of an internal configuration of energy storage pack 51 that is mounted on aerial vehicle 1. Energy storage pack 51 includes energy storage module 511 and printed circuit board 512. Energy storage module 511 includes a plurality of cells E1 to En that are connected in series. Energy storage module 511 may be configured such that a plurality of energy storage modules are connected in series or are connected in series as well as in parallel with each other. As the cell, a lithium ion battery cell, a nickel metal hydride battery cell, a lead battery cell, an electric double layer capacitor cell, a lithium ion capacitor cell, or the like can be used. Hereinafter, in this specification, the description is made by estimating an example where a lithium ion battery cell (having a nominal voltage of 3.6 V to 3.7 V) is used as the cell. The number of cells E1 to En that are connected in series is determined in accordance with a drive voltage of motor 21.

Shunt resistor Rs is connected in series with the plurality of cells E1 to En. Shunt resistor Rs functions as a current detection element. A Hall element may be used in place of shunt resistor Rs. In energy storage module 511, temperature sensor T1 (for example, a thermistor) for detecting temperatures of the plurality of cells E1 to En is disposed. A plurality of temperature sensors T1 may be disposed.

On printed circuit board 512, voltage measurement unit 513, temperature measurement unit 514, current measurement unit 515, and management unit 516 are mounted. A plurality of voltage measurement lines are connected between voltage measurement unit 513 and respective nodes of plurality of cells E1 to En that are connected in series. Voltage measurement unit 513 measures the voltages of the respective cells E1 to En by measuring each voltage between two voltage measurement lines disposed adjacently to each other. Voltage measurement unit 513 transmits the measured voltages of cells E1 to En to management unit 516.

Voltage measurement unit 513 has a higher voltage than management unit 516 and hence, voltage measurement unit 513 and management unit 516 are connected to each other by a communication line in a state where voltage measurement unit 513 and management unit 516 are insulated from each other. Voltage measurement unit 513 may be formed of an application specific integrated circuit (ASIC) or a general-purpose analog front-end IC. Voltage measurement unit 513 includes a multiplexer and an A/D converter. The multiplexer outputs a voltage between two voltage measurement lines disposed adjacently to each other to the A/D converter in order from the top. The A/D converter converts an analog voltage inputted from the multiplexer into a digital value.

Temperature measurement unit 514 includes a voltage dividing resistor and an A/D converter. The A/D converter converts analog voltages that are obtained by division using temperature sensor T1 and the voltage dividing resistor into digital values, and outputs the digital values to management unit 516. Management unit 516 estimates the temperatures of the plurality of cells E1 to En based on the digital values.

Current measurement unit 515 includes a differential amplifier and an A/D converter. The differential amplifier amplifies an across voltage of shunt resistor Rs and outputs the amplified voltage to the A/D converter. The A/D converter converts an analog voltage inputted from the differential amplifier into a digital value, and outputs the digital value to management unit 516. Management unit 516 estimates a current that flows through the plurality of cells E1 to En based on the digital value.

A case is considered where an A/D converter is mounted in management unit 516, and an analog input port is disposed in management unit 516. In this case, temperature measurement unit 514 and current measurement unit 515 may output an analog voltage to management unit 516, and the analog voltage may be converted into a digital value by the A/D converter in management unit 516.

Management unit 516 may be formed of a microcomputer and a nonvolatile memory. Management unit 516 manages a state of the plurality of cells E1 to En based on the voltages, the temperatures, and the currents of the plurality of cells E1 to En that are measured by voltage measurement unit 513, temperature measurement unit 514, and current measurement unit 515.

Management unit 516 can estimate the SOCs and the SOHs of the plurality of respective cells E1 to En. Management unit 516 can estimate the SOCs using an open circuit voltage (OCV) method or a current integration method.

The SOH is defined by a ratio of present full charge capacity (FCC) with respect to an initial full charge capacity (FCC). This means that the lower a numerical value of the SOH (closer to 0%), the more the deterioration of the cells is advanced. The SOH may be obtained by measuring the capacity through full charging and discharging, or may be obtained by adding storage deterioration and cycle deterioration. The storage deterioration can be estimated based on the SOC, the temperature, and a storage deterioration rate. The cycle deterioration can be estimated based on an SOC range in which the battery pack is used, a temperature, a current rate, and a cycle deterioration rate. The storage deterioration rate and the cycle deterioration rate can be derived preliminarily by experiments or simulations. The SOC, the temperature, the SOC range, and the current rate can be obtained by measurement.

Further, the SOH can also be estimated based on a correlation between the SOH and the internal resistance of a cell. The internal resistance can be estimated by dividing a voltage drop that occurs when a predetermined current flows through the cell for a predetermined time by the current value. There is a relationship in which the higher the temperature, the lower the internal resistance becomes, and there is a relationship in which the lower the SOH, the higher internal resistance becomes.

Energy storage pack 51 includes, as external terminals, a positive electrode terminal + that is connected to a positive electrode of energy storage module 511, a negative electrode terminal − that is connected to a negative electrode of energy storage module 511, and control terminal CNT that is connected to printed circuit board 512. Communication line 71 is connected to control terminal CNT. Management unit 516 transmits monitoring data of the plurality of cells E1 to En to power supply controller 70 for every predetermined period via communication line 71. Voltages, temperatures, and currents of the plurality of cells E1 to En are transmitted as the monitoring data. With respect to the SOC and the SOH, management unit 516 may estimate the SOC and the SOH and transmit the SOC and the SOH to power supply controller 70, or may estimate the SOC and the SOH based on the voltage, the temperature, and the current received by the power supply controller 70.

As a communication protocol between eight energy storage packs 51 to 58 and power supply controller 70, for example, an RS-485, a TCP/IP, a controller area network (CAN), or the like can be used. Eight energy storage packs 51 to 58 and power supply controller 70 may be connected to each other through wireless communication or power line communication.

Figure 4:
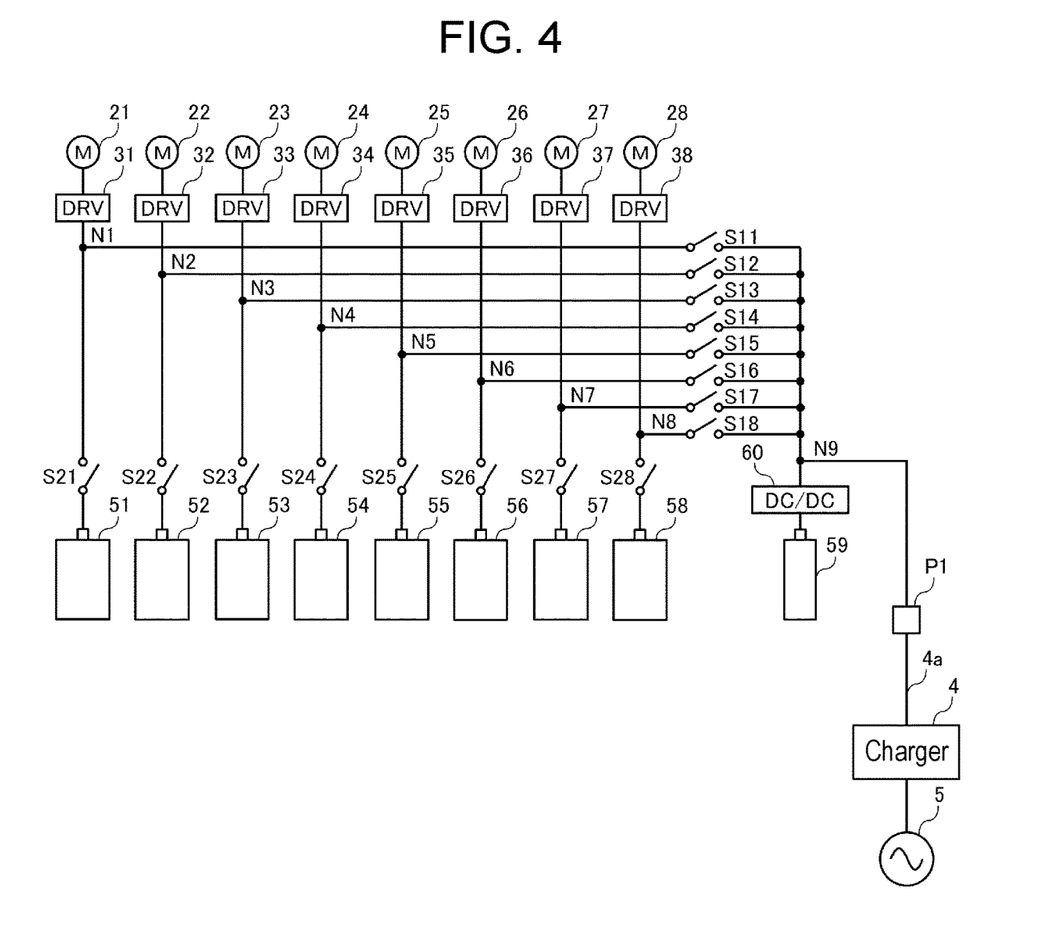
FIG. 4 is a diagram illustrating a connection state of eight energy storage packs that are mounted on the aerial vehicle at the time of charging the eight energy storage packs.

FIG. 4 is a diagram illustrating a connection state of eight energy storage packs 51 to 58 mounted on aerial vehicle 1. By inserting charging cable 4a into the charge port P1, it is possible to charge eight energy storage packs 51 to 58 and sub energy storage pack 59 from charger 4 installed outside. In the exemplary embodiment, charger 4 is assumed to be a quick charger having a power conversion function of converting three-phase AC power supplied from commercial power system 5 into DC power. Charger 4 generates DC power by performing full-wave rectifying of AC power supplied from commercial power system 5, and by smoothing the rectified AC power by a filter.

Before starting charging first energy storage pack 51 to eighth energy storage pack 58, power supply controller 70 charges sub energy storage pack 59 in order to prevent an inrush current by controlling DC/DC converter 60. Thereafter, power supply controller 70 turns on 1.1th switch S11 and 2.1th switch S21 to charge first energy storage pack 51 from charger 4. At the time of performing such charging, sub energy storage pack 59 acts as capacity for smoothing the charge voltage.

When the charging of first energy storage pack 51 is completed, power supply controller 70 turns off 1.1th switch S11 and 2.1th switch S21, and then turns on 1.2th switch S12 and 2.2th switch S22 to charge second energy storage pack 52 from charger 4. Hereinafter, in the same manner as described above, the charging is sequentially performed up to eighth energy storage pack 58.

In the embodiment, to simultaneously charge first energy storage pack 51 to eighth energy storage pack 58, power supply controller 70 may control all of 1.1th switch S11 to 1.8th switch S18 and 2.1th switch S21 to 2.8th switch S28 to an ON state. Power packs may be charged such that two power packs are simultaneously charged each time and such charging is sequentially performed. Alternatively, power packs may be charged such that four power packs are simultaneously charged each time and such charging is sequentially performed. The number of energy storage packs that can be charged simultaneously depends on the specifications of respective components of the power supply system.

When charger 4 is a normal-type charger, the energy storage packs are charged with single-phase 100/200 V AC power. When the energy storage packs are charged with an alternating current, an AC/DC converter (not illustrated in the drawing) is inserted into a current path between node N9 and charge port P1. The AC/DC converter converts AC power inputted from charger 4 into DC power and outputs the DC power toward node N9.

Figure 5:
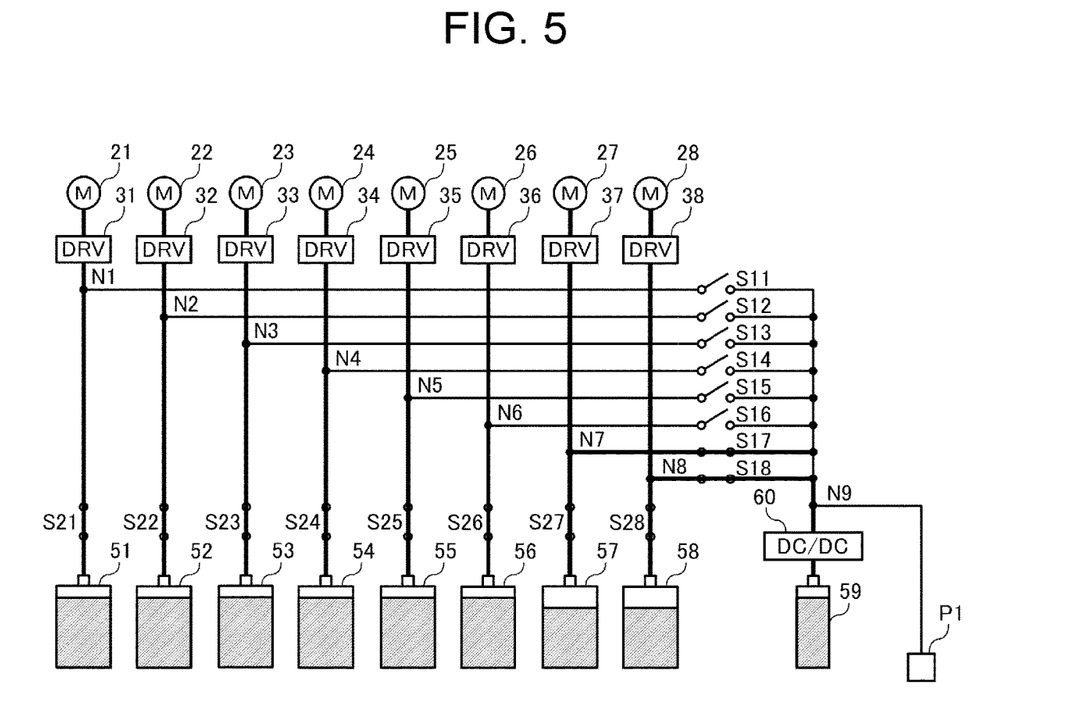
FIG. 5 is a diagram illustrating an example of a state of the power supply system during a flight of the aerial vehicle.

FIG. 5 is a diagram illustrating an example of a state of the power supply system during a flight of aerial vehicle 1. As described above, in advancing aerial vehicle 1, it is necessary to increase the rotational speeds of fifth motor 25 to eighth motor 28 than the rotational speeds of first motor 21 to fourth motor 24. Further, when aerial vehicle 1 advances leftward and frontward, it is necessary to increase the rotational speeds of seventh motor 27 and eighth motor 28 than rotational speeds of first motor 21 to sixth motor 26.

FIG. 5 is a diagram illustrating an example of a state of the power supply system when aerial vehicle 1 advances leftward and frontward. When aerial vehicle 1 advances leftward and forward, it is necessary to increase the rotational speeds of seventh motor 27 and eighth motor 28. Accordingly, the power consumption of seventh motor 27 and eighth motor 28 becomes larger than the power consumption of first motor 21 to sixth motor 26. That is, loads of seventh motor 27 and eighth motor 28 become larger than loads of first motor 21 to the sixth motor 26. In this case, the SOCs of seventh energy storage pack 57 and eighth energy storage pack 58 are decreased earlier than the SOCs of first energy storage pack 51 to sixth energy storage pack 56.

In the example illustrated in FIG. 5, power supply controller 70 controls 1.7th switch S17 and 1.8th switch S18 that are inserted into the second current path connected to seventh motor 27 and eighth motor 28 that have the larger power consumption than first motor 21 to sixth motor 26 to an ON state. On the other hand, power supply controller 70 maintains 1.1th switch S11 to 1.6th switch S16 that are inserted into the second current path connected to first motor 21 to sixth motor 26 in an OFF state. With such an operation, an auxiliary current is supplied only to seventh motor 27 and eighth motor 28 from sub energy storage pack 59. Accordingly, the decrease of the SOCs of seventh energy storage pack 57 and eighth energy storage pack 58 is alleviated.

Hereinafter, an ON/OFF control of the first switch that is inserted into the second current path connected to the motor having larger power consumption than other motors is described in detail. Basically, the following processing is executed in a state where the irregularities in power consumption among first energy storage pack 51 to eighth energy storage pack 58 exceeds a predetermined value.

Power supply controller 70 specifies at least one energy storage pack having a high current value than other energy storage packs based on respective current values of first energy storage pack 51 to eighth energy storage pack 58 received from first energy storage pack 51 to eighth energy storage pack 58. Power supply controller 70 calculates an overcurrent value of the specified energy storage pack. In the example illustrated in FIG. 5, power supply controller 70 calculates a whole overcurrent value by summing an overcurrent value of seventh energy storage pack 57 and an overcurrent value of eighth energy storage pack 58. Power supply controller 70 determines a current command value of DC/DC converter 60 such that an output current value of DC/DC converter 60 becomes the overcurrent value. Power supply controller 70 sets the determined current command value in DC/DC converter 60 so as to operate DC/DC converter 60, and turns on 1.7th switch S17 to 1.8th switch S18. When the irregularities in the respective current values of first energy storage pack 51 to eighth energy storage pack 58 fall within a predetermined value, power supply controller 70 stops DC/DC converter 60, and turns off 1.7th switch S17 to 1.8th switch S18.

Further, power supply controller 70 may perform an ON/OFF control of the first switch as follows. Power supply controller 70 acquires the rotational speeds of first motor 21 to eighth motor 28 from machine body controller 40. Power supply controller 70 specifies at least one energy storage pack having a high rotational speed than other energy storage packs based on the acquired respective rotational speeds. Power supply controller 70 calculates an overcurrent value corresponding to the excessive rotational speed of the specified energy storage pack. In the example illustrated in FIG. 5, power supply controller 70 calculates a whole overcurrent value by summing an overcurrent value of seventh energy storage pack 57 and an overcurrent value of eighth energy storage pack 58. Hereinafter, substantially the same processing described above is executed.

Further, power supply controller 70 may perform an ON/OFF control of the first switch as follows. Power supply controller 70 specifies at least one energy storage pack having a smaller voltage value than other energy storage packs based on respective voltage values received from first energy storage pack 51 to eighth energy storage pack 58. Power supply controller 70 determines a voltage command value of DC/DC converter 60 such that an output voltage value of DC/DC converter 60 becomes higher than the voltage value of the specified energy storage pack. Power supply controller 70 sets the determined voltage command value in DC/DC converter 60 so as to operate DC/DC converter 60, and turns on 1.7th switch S17 to 1.8th switch S18. When the irregularities in the voltage values or the SOCs of first energy storage pack 51 to eighth energy storage pack 58 fall within a predetermined value, power supply controller 70 stops DC/DC converter 60, and turns off 1.7th switch S17 to 1.8th switch S18.

Figure 6:
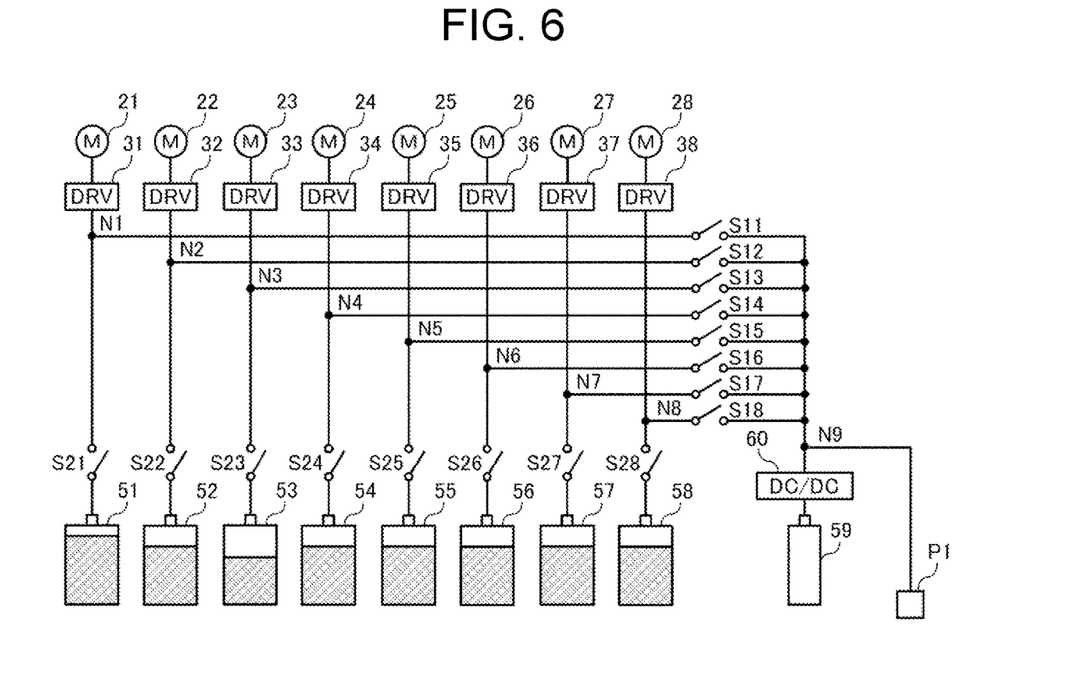
FIG. 6 is a diagram for explaining an example of equalization processing of capacities among a first energy storage pack to an eighth energy storage pack during parking of the aerial vehicle (part 1).
Figure 7:
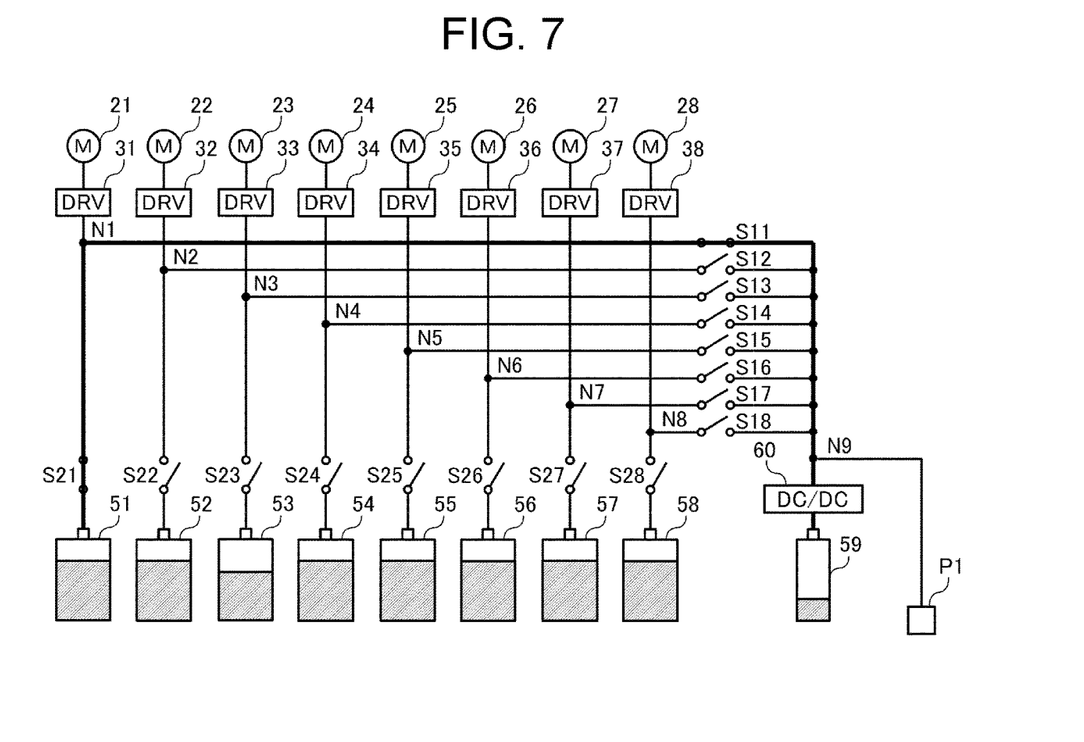
FIG. 7 is a diagram for explaining an example of equalization processing of the capacities among the first energy storage pack to the eighth energy storage pack during parking of the aerial vehicle (part 2).
Figure 8:
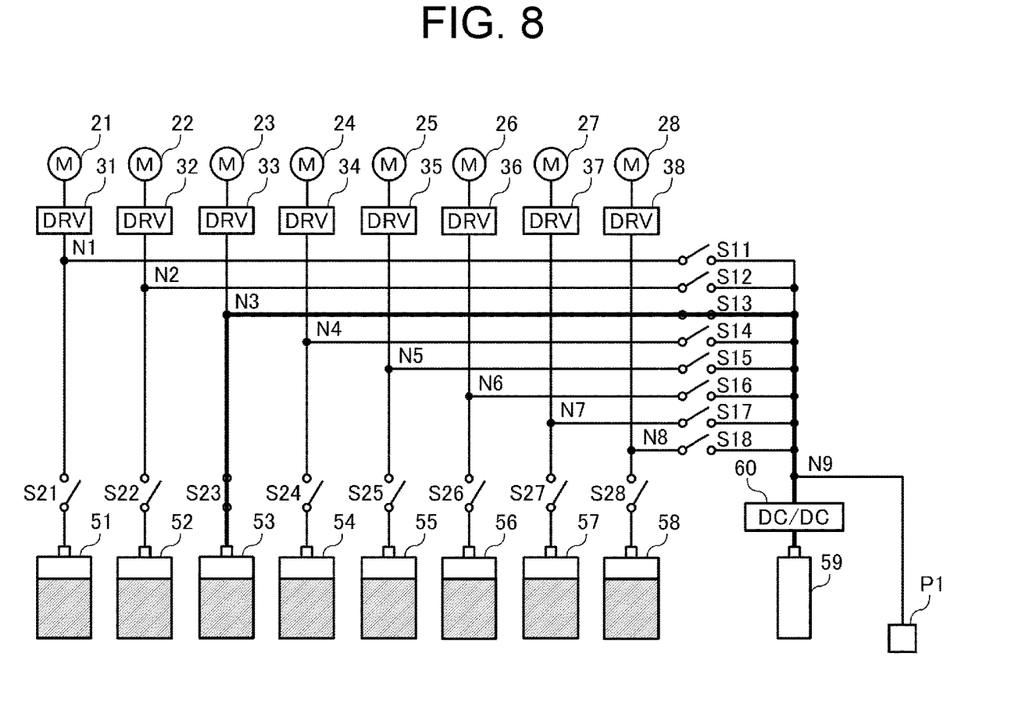
FIG. 8 is a diagram for explaining an example of equalization processing of capacities between the first energy storage pack and the eighth energy storage pack during parking of the aerial vehicle (part 3).

FIG. 6 to FIG. 8 are block diagrams for explaining an example of equalization processing for equalizing capacities among first energy storage pack 51 to eighth energy storage pack 58 during parking of aerial vehicle 1. In this example, it is assumed a state where aerial vehicle 1 temporarily parks at a place where no charger 4 exists. During the temporary parking of aerial vehicle 1, power supply controller 70 equalizes the capacities among first energy storage pack 51 to eighth energy storage pack 58 by an active balance method.

For example, power supply controller 70 calculates an average value of the voltages of first energy storage pack 51 to eighth energy storage pack 58 received from first energy storage pack 51 to eighth energy storage pack 58, and sets the calculated average value to an equalization target voltage (hereinafter, simply referred to as a target voltage).

Power supply controller 70 transfers energy from the energy storage pack having a voltage higher than the target voltage (first energy storage pack 51 in FIG. 6) to the energy storage pack having a voltage lower than the target voltage (third energy storage pack 53 in FIG. 6). First, as illustrated in FIG. 7, power supply controller 70 controls 1.1th switch S11 and 2.1th switch S21 to an ON state, and charges sub energy storage pack 59 from first energy storage pack 51 until the voltage of first energy storage pack 51 is decreased to the target voltage. When the voltage of first energy storage pack 51 is lower than the voltage of sub energy storage pack 59, power supply controller 70 controls DC/DC converter 60 so as to increase the voltage of first energy storage pack 51.

Next, as illustrated in FIG. 8, power supply controller 70 controls 1.3th switch S13 and 2.3th switch S23 to an ON state, and charges third energy storage pack 53 from sub energy storage pack 59 until the voltage of third energy storage pack 53 is increased to the target voltage. When the voltage of sub energy storage pack 59 is lower than the voltage of third energy storage pack 53, power supply controller 70 controls DC/DC converter 60 to increase the voltage of sub energy storage pack 59.

Power supply controller 70 repeatedly performs the above-mentioned processing until the voltages of first energy storage pack 51 to eighth energy storage pack 58 are all equalized. In the description made above, the example where the voltage is used as the equalization target value is described. However, an SOC, an actual capacity, a dischargeable capacity, or a rechargeable capacity may be used instead of the voltage.

Even in a case where there is no substantial irregularities in capacity among first energy storage pack 51 to eighth energy storage pack 58, when the SOCs of first energy storage pack 51 to eighth energy storage pack 58 are lowered to a set value or below, power supply controller 70 may charge first energy storage pack 51 to eighth energy storage pack 58 from sub energy storage pack 59.

By the way, there may be a case where a failure occurs in at least one of first energy storage pack 51 to eighth energy storage pack 58. When the supply of a current from the energy storage pack in which the failure has occurred to the corresponding motor is stopped, it becomes difficult to control the posture of aerial vehicle 1. To cope with such a drawback, power supply controller 70 controls the second switch inserted into the first current path connected to the energy storage pack in which a failure has occurred on an OFF state, and controls the first switch inserted into the second current path connected to the energy storage pack to an ON state. With such a control, it is possible to continue the supply of a current from sub energy storage pack 59 to the motor. That is, sub energy storage pack 59 functions as an energy storage pack that substitutes for the energy storage pack in which a failure has occurred.

In this exemplary embodiment, a rated output of sub energy storage pack 59 is set to a value corresponding to rated outputs of first energy storage pack 51 to eighth energy storage pack 58. As described above, there is the case where sub energy storage pack 59 is used as a substitute for at least one of first energy storage pack 51 to eighth energy storage pack 58. Accordingly, sub energy storage pack 59 is required to possess the output performance substantially equal to the output performances of first energy storage pack 51 to eighth energy storage pack 58.

The capacity of sub energy storage pack 59 is designed to be smaller than the capacities of first energy storage pack 51 to eighth energy storage pack 58. It is desirable that sub energy storage pack 59 have large capacity from a viewpoint of securing backup capacity and securing a buffer region. However, when sub energy storage pack 59 has large capacity, a weight of sub energy storage pack 59 is increased, and the increase of the weight of sub energy storage pack 59 becomes a factor that lowers an economy of electricity of aerial vehicle 1. In this exemplary embodiment, the priority is assigned to the economy of electricity of the aerial vehicle 1. Accordingly, the capacity of sub energy storage pack 59 is designed to be smaller than the capacities of first energy storage pack 51 to eighth energy storage pack 58.

As described above, according to the present exemplary embodiment, aerial vehicle 1 includes the plurality of energy storage packs 51 to 58 and sub energy storage pack 59. Accordingly, even when an abnormality occurs in any one of the energy storage packs during flight, a stable flight can be continued by switching the energy storage pack in which the abnormality has occurred to sub energy storage pack 59. Accordingly, safety of aerial vehicle 1 during flight can be improved, and this also contributes to the practical use of a manned drone.

Further, by supplying an auxiliary current from sub energy storage pack 59 to the motor having a high rotational speed during the flight, the irregularities in the decrease of SOC among first energy storage pack 51 to eighth energy storage pack 58 can be suppressed. As a result, the number of charge/discharge cycles among first energy storage pack 51 to eighth energy storage pack 58 can be made uniform. Accordingly, the varieties in the decrease of SOH among first energy storage pack 51 to eighth energy storage pack 58 can be suppressed. Accordingly, the exchange timing can be made equal among first energy storage pack 51 to eighth energy storage pack 58. Such an advantageous effect also contributes to the reduction of an operation cost of the energy storage packs.

Further, by equalizing the capacities of first energy storage pack 51 to eighth energy storage pack 58 by an active balance method during the temporary parking of aerial vehicle 1, the capacities of first energy storage pack 51 to eighth energy storage pack 58 can be effectively and maximally utilized. That is, it is possible to prevent the actual flight distance from becoming shorter than a flyable distance that aerial vehicle 1 can originally fly with the whole capacity of first energy storage pack 51 to eighth energy storage pack 58. Further, by utilizing sub energy storage pack 59 as a buffer, it is possible to efficiently perform the equalization by an active balance method. A surplus capacity generated in the equalization performed by an active balance method can be charged to sub energy storage pack 59. Accordingly, unlike a case where the equalization is performed in a passive balance method where a surplus capacity is discarded, it is possible to effectively utilize the surplus capacity.

At the time of performing the equalization processing by an active balance method, electricity is charged from the energy storage pack having high SOC to the energy storage pack having low SOC via DC/DC converter 60 and sub energy storage pack 59. With such an operation, it is possible to appropriately control an equalizing current without connecting a DC/DC converter to each of first energy storage pack 51 to eighth energy storage pack 58. At the time of performing the equalization processing by an active balance method, it is also possible to prevent an inrush current from flowing from the energy storage pack having a high SOC to the energy storage pack having a low SOC. Accordingly, the cost can be reduced while ensuring the safety.

Further, by coupling a plurality of buses that are connected between the respective first to eighth energy storage packs 51 to 58 and sub energy storage pack 59, and by supplying electricity to the node N9 of the plurality of buses from the outside, a charging operation to charge the first energy storage pack 51 to eighth energy storage pack 58 can be simplified. When the respective first to eighth energy storage packs 51 to 58 are charged from the outside, an operation of inserting a charging cable 4a eight times becomes necessary. However, in the present exemplary embodiment, it is sufficient to perform such an operation only one time. Further, it is possible to allow sub energy storage pack 59 to function as a smoothing capacity at the time of charging and hence, an inrush current that may occur at the time of starting charging can be suppressed.

The present disclosure has been described above in accordance with the exemplary embodiment. It will be understood by the person of ordinary skill in the art that the exemplary embodiment is merely an example, other modified examples in which configuration elements and processing processes of the exemplary embodiment are variously combined are possible, and the other modifications still fall within the scope of the present disclosure.

In the above-described exemplary embodiment, the description has been made by taking the case where the power supply system is mounted on aerial vehicle 1 as an example. In this respect, the power supply system can be also mounted on a moving object other than aerial vehicle 1. For example, the power supply system can be also mounted on an in-wheel motor type electric vehicle.

Figure 9:
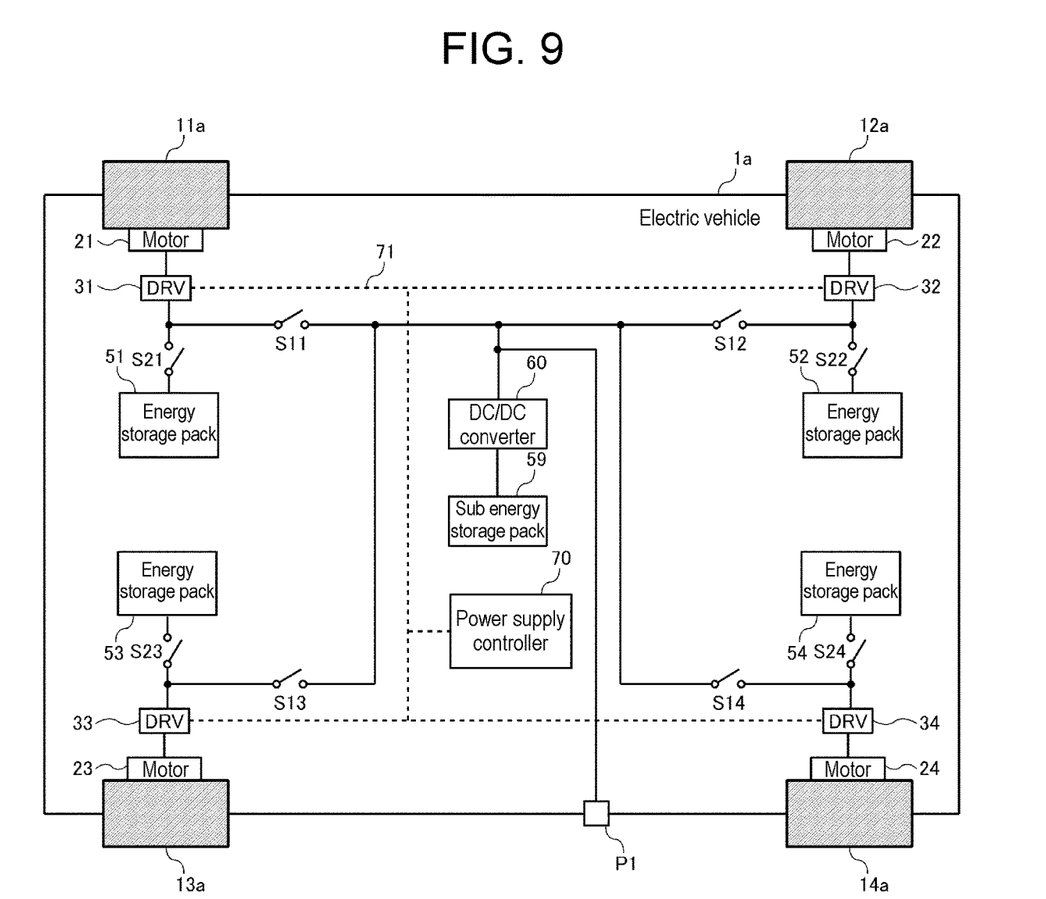
FIG. 9 is a functional block diagram of an electric vehicle adopting an in-wheel-motor system on which the power supply system according to the exemplary embodiment is mounted.

FIG. 9 is a functional block diagram of in-wheel-motor system electric vehicle 1a on which a power supply system according to an exemplary embodiment is mounted. Electric vehicle 1a includes four tires 11a to 14a, four motors 21 to 24, four motor driver 31 to 34, and a power supply system. In FIG. 9, the configuration relating to a rotation control of four motors 21 to 24 is omitted.

The power supply system mounted on electric vehicle 1a includes four energy storage packs 51 to 54, sub energy storage pack 59, four first switches S11 to S14, four second switches S21 to S24, DC/DC converter 60, and power supply controller 70. The power supply system of this exemplary embodiment performs substantially the same operations as the above-mentioned power supply system that is mounted on the aerial vehicle 1 except that a current system adopts four lines in place of eight lines. Power supply controller 70 controls four first switches S11 to S14 and four second switches S21 to S24 so as to adjust the balance of the capacities between four energy storage packs 51 to 58.

According to electric vehicle 1a illustrated in FIG. 9, four energy storage packs 51 to 54 are disposed in the vicinity of four tires 11a to 14a respectively. With such a configuration, a cabin space can be designed to have a wide space compared to a case where one large-capacity energy storage pack is disposed below a cabin space. Further, with the provision of four energy storage packs 51 to 54 and sub energy storage pack 59, it is possible to enhance the continuation of traveling when an abnormality occurs in the energy storage pack. Such a configuration is especially effective in a genuine electric vehicle on which no internal combustion engine is mounted.

In the above-mentioned exemplary embodiment, the description has been made with respect to aerial vehicle 1 that includes eight propellers 11 to 18. In this respect, the number of propellers is not limited to eight. For example, the number of propellers may be 4, 6, or 12.

The exemplary embodiment may be specified by the following items.

[Item 1]

A power supply system for a moving object that includes: a plurality of energy storage packs (51-58) configured to respectively supply a current to a plurality of motor driver (31 to 38) for driving a plurality of motors (21 to 28) mounted on the moving object (1); a sub energy storage pack (59) configured to supply the current to at least one of a plurality of first current paths that are connected between the plurality of motor driver (31 to 38) and the plurality of energy storage packs (51 to 58) or to absorb the current from at least one of the plurality of first current paths;

- a plurality of first switches (S11 to S18) respectively inserted into a plurality of second current paths that are connected between the plurality of first current paths and the sub energy storage pack (59);
- a plurality of second switches (S21 to S28) respectively inserted between a plurality of connecting points (N1 to N8) on the plurality of the first current path to which the plurality of second current paths are connected and the plurality of energy storage packs (51 to 58); and
- a controller (70) configured to adjust a balance in capacity among the plurality of energy storage packs (51 to 58) by controlling the plurality of first switches (S11 to S18) and the plurality of second switches (S21 to S28).

With such a configuration, it is possible to effectively utilize the capacities of the plurality of energy storage packs (51 to 58).

[Item 2]

The power supply system for a moving object according to item 1, wherein a capacity of sub energy storage pack (59) is smaller than capacities of the plurality of energy storage packs (51 to 58).

With such a configuration, it is possible to suppress an increase in weight of moving object (1) thus suppressing lowering of economy of electricity of moving object (1).

[Item 3]

The power supply system for a moving object according to item 1 or 2, wherein when irregularities occur in power consumption of the plurality of motors (21 to 28) during movement of moving object (1), controller (70) is configured to control the first switch that is inserted into a second current path connected to a motor having a larger power consumption than other motors to an ON state.

With such a configuration, it is possible to equalize the lowering of the SOCs of the plurality of energy storage packs (51 to 58).

[Item 4]

The power supply system for a moving object according to any one of items 1 to 3, wherein during a period in which moving object (1) is being stopped, the controller (70) is configured to equalize the capacities of the plurality of energy storage packs (51 to 58) by an active balance method.

With such a configuration, the capacities of the plurality of energy storage packs (51-58) can be equalized without a waste.

[Item 5]

The power supply system for a moving object according to any one of items 1 to 4, wherein
the plurality of second current paths are coupled to each other and are connected to sub energy storage pack (59), and
the power supply system for a moving object further includes DC/DC converter (60) between node (N9) of the plurality of second current paths and sub energy storage pack (59).

With such a configuration, it is possible to appropriately control a charge/discharge current of sub energy storage pack (59).

[Item 6]

The power supply system for a moving object according to any one of items 1 to 5, wherein
the plurality of second current paths are coupled to each other and are connected to sub energy storage pack (59), and a charging path from external charger (4) is connected to a path between a node (N9) of the plurality of second current paths and sub energy storage pack (59).

With such a configuration, it is possible to charge the plurality of energy storage packs (51 to 58) and sub energy storage pack (59) in one connecting operation.

[Item 7]

An aerial vehicle (1) includes:
a plurality of propellers (11 to 18);
a plurality of motors (21 to 28) configured to respectively rotate the plurality of propellers (11 to 18);
a plurality of motor driver (31 to 38) configured to respectively drive the plurality of motors (21 to 28);
a plurality of energy storage packs (51 to 58) configured to respectively supply a current to the plurality of motor driver (31 to 38);
sub energy storage pack (59) configured to supply a current to at least one of a plurality of first current paths connecting the plurality of motor driver (31 to 38) and the plurality of energy storage packs (51 to 58) or to absorb a current from at least one of the plurality of first current paths;
a plurality of first switches (S11 to S18) respectively inserted in a plurality of second current paths connecting the plurality of first current paths and sub energy storage pack (59);
a plurality of second switches (S21 to S28) respectively inserted between a plurality of connecting points (N1 to N8) on the plurality of first current paths to which the plurality of second current paths are connected and the plurality of energy storage packs (51 to 58); and
controller (70) configured to adjust a balance of capacities between the plurality of energy storage packs (51 to 58) by controlling the plurality of first switches (S11 to S18) and the plurality of second switches (S21 to S28).

With such a configuration, it is possible to realize aerial vehicle (1) equipped with the power supply system capable of effectively utilizing the capacities of the plurality of energy storage packs (51 to 58).

REFERENCE MARKS IN THE DRAWINGS

1: aerial vehicle
2: body portion
11 to 18: propeller
21 to 28: motor
31 to 38: motor drive unit
40: machine body controller
41: sensor
51 to 58: energy storage pack
59: sub energy storage pack
511: energy storage module
E1 to En: cell
Rs: shunt resistor
T1: temperature sensor
512: printed circuit board
513: voltage measurement unit
514: temperature measurement unit
515: current measurement unit
516: management unit
60: DC/DC converter
70: power supply controller
71: communication line
S11 to S18: first switch
S21 to S28: second switch
P1: charge port
4: charger
4a: charging cable
5: commercial power system
1a: electric vehicle
11a to 14a: tire

The invention claimed is:

1. A power supply system for a moving object, the power supply system comprising:
a plurality of energy storage packs configured to respectively supply a current to a plurality of motor driver for driving a plurality of motors mounted on the moving object;
a sub energy storage pack configured to supply the current to at least one of a plurality of first current paths that are connected between the plurality of motor driver and the plurality of energy storage packs to pull the current from at least one of the plurality of first current paths;

a plurality of first switches respectively inserted in a plurality of second current paths that are connected between the plurality of first current paths and the sub energy storage pack;

a plurality of second switches respectively inserted between a plurality of connecting points on the plurality of the first current paths to which the plurality of second current paths are connected and the plurality of energy storage packs; and a controller configured to adjust a balance in capacity among the plurality of energy storage packs by controlling the plurality of first switches and the plurality of second switches.

2. The power supply system for a moving object according to claim 1, wherein a capacity of the sub energy storage pack is smaller than capacities of the plurality of energy storage packs.

3. The power supply system for a moving object according to claim 1, wherein when a variation occurs in power consumption of the plurality of motors during movement of the moving object, the controller causes a first switch, that is inserted into a second current path connected to a motor including the power consumption larger than other motors among the plurality of motors to an ON state.

4. The power supply system for a moving object according to claim 1, wherein during a period in which the moving object is stopped, the controller is configured to equalize the capacities of the plurality of energy storage packs by an active balance method.

5. The power supply system for a moving object according to claim 1, wherein the plurality of second current paths are coupled to each other and are connected to the sub energy storage pack, and the power supply system for a moving object further includes a DC/DC converter between a node of the plurality of second current paths and the sub energy storage pack.

6. The power supply system for a moving object according to claim 1, wherein the plurality of second current paths are coupled to each other and are connected to the sub energy storage pack, and a charging path from an external charger is connected to a path between a node of the plurality of second current paths and the sub energy storage pack.

7. An aerial vehicle comprising:

a plurality of propellers;

a plurality of motors configured to respectively rotate the plurality of propellers;

a plurality of motor driver configured to respectively drive the plurality of motors;

a plurality of energy storage packs configured to respectively supply a current to the plurality of motor driver;

a sub energy storage pack configured to supply a current to at least one of a plurality of first current paths connecting the plurality of motor driver and the plurality of energy storage packs or to pull a current from at least one of the plurality of first current paths;

a plurality of first switches respectively inserted in a plurality of second current paths connecting the plurality of first current paths and the sub energy storage pack;

a plurality of second switches respectively inserted between a plurality of connecting points on the plurality of first current paths to which the plurality of second current paths are connected and the plurality of energy storage packs; and a controller configured to adjust a balance of capacities between the plurality of energy storage packs by controlling the plurality of first switches and the plurality of second switches.

* * * * *